United States Patent
Gadient et al.

(10) Patent No.: US 8,965,538 B2
(45) Date of Patent: Feb. 24, 2015

(54) METHODS AND APPARATUS FOR STATE LIMITING IN A CONTROL SYSTEM

(75) Inventors: Ross J. Gadient, Long Beach, CA (US); Eugene Lavretsky, Los Angeles, CA (US); David C. Hyde, Long Beach, CA (US)

(73) Assignee: The Boeing Company, Chicago, IL (US)

(*) Notice: Subject to any disclaimer, the term of this patent is extended or adjusted under 35 U.S.C. 154(b) by 581 days.

(21) Appl. No.: 12/783,230

(22) Filed: May 19, 2010

(65) Prior Publication Data

US 2011/0288661 A1     Nov. 24, 2011

(51) Int. Cl.
| | | |
|---|---|---|
| G05B 13/02 | (2006.01) | |
| G05B 13/04 | (2006.01) | |
| G06F 17/00 | (2006.01) | |
| G05D 1/00 | (2006.01) | |
| G01C 22/00 | (2006.01) | |
| G05D 3/00 | (2006.01) | |
| B60T 7/12 | (2006.01) | |

(52) U.S. Cl.
CPC .............. G05B 13/04 (2013.01); G05D 1/0066 (2013.01)
USPC ........ 700/32; 701/2; 701/13; 701/23; 701/48; 701/68; 701/91; 700/33

(58) Field of Classification Search
USPC ............. 701/2, 13, 23, 48, 68, 91; 700/32, 33
See application file for complete search history.

(56) References Cited

U.S. PATENT DOCUMENTS

| | | | | |
|---|---|---|---|---|
| 3,627,236 A | * | 12/1971 | Hess | 244/182 |
| 3,676,648 A | * | 7/1972 | Wesner | 700/34 |
| 3,830,447 A | * | 8/1974 | Phillips | 244/170 |
| 3,886,915 A | * | 6/1975 | Taplin | 123/357 |
| 4,003,445 A | * | 1/1977 | De Bruine | 180/168 |
| 4,021,714 A | * | 5/1977 | Jones et al. | 318/594 |
| 4,033,525 A | * | 7/1977 | Leonard et al. | 244/3.15 |
| 4,047,083 A | * | 9/1977 | Plunkett | 318/807 |
| 4,094,556 A | * | 6/1978 | Okamoto et al. | 303/196 |
| 4,120,583 A | * | 10/1978 | Hyatt | 355/86 |
| 4,184,166 A | * | 1/1980 | Olson | 346/49 |
| 4,211,193 A | * | 7/1980 | Cox et al. | 123/352 |
| 4,220,993 A | * | 9/1980 | Schloeman | 701/100 |
| 4,285,046 A | * | 8/1981 | Henry | 708/422 |
| 4,286,685 A | * | 9/1981 | Rudolph et al. | 180/176 |
| 4,355,358 A | * | 10/1982 | Clelford et al. | 701/3 |
| 4,364,110 A | * | 12/1982 | Hyatt | 700/180 |

(Continued)

OTHER PUBLICATIONS

Srikanth et al., "A Robust Environment for Simulation and Testing of Adaptive Control for Mini-UAVs" Jun. 10-12, 2009, American Control Conference, 6 pages.*

(Continued)

*Primary Examiner* — Robert Fennema
*Assistant Examiner* — Thomas Stevens
(74) *Attorney, Agent, or Firm* — Armstrong Teasdale LLP

(57) ABSTRACT

A method for operating a controlled device. A feedback signal is received from a controlled device, the feedback signal indicating actual system dynamics of the controlled device. A predefined limit is applied to the actual system dynamics to create limited system dynamics. A modulation parameter is calculated by a processor based at least in part on the limited system dynamics and the actual system dynamics. Desired system dynamics for the controlled device are generated by the processor based at least in part on the modulation parameter and an external command.

17 Claims, 4 Drawing Sheets

(56) References Cited

U.S. PATENT DOCUMENTS

| | | | |
|---|---|---|---|
| 4,370,714 A * | 1/1983 | Rettich et al. | 701/70 |
| 4,371,941 A * | 2/1983 | Gordiski et al. | 700/190 |
| 4,792,902 A * | 12/1988 | Hrovat et al. | 701/105 |
| 5,042,742 A * | 8/1991 | Hufault et al. | 244/3.11 |
| 5,047,947 A * | 9/1991 | Stump | 700/106 |
| 5,124,626 A * | 6/1992 | Thoen | 318/610 |
| 5,161,099 A * | 11/1992 | Yamaguchi | 700/33 |
| 5,283,738 A * | 2/1994 | Schwab et al. | 701/68 |
| 5,310,136 A * | 5/1994 | Fowler et al. | 244/17.13 |
| 5,357,425 A * | 10/1994 | Minto | 700/73 |
| 5,390,105 A * | 2/1995 | Worley et al. | 700/79 |
| 5,446,648 A * | 8/1995 | Abramovitch et al. | 700/53 |
| 5,463,854 A * | 11/1995 | Chmielewski et al. | 56/10.2 E |
| 5,568,022 A * | 10/1996 | Tranovich | 318/566 |
| 5,623,402 A * | 4/1997 | Johnson | 700/42 |
| 5,716,032 A * | 2/1998 | McIngvale | 244/185 |
| 5,880,415 A * | 3/1999 | Colby et al. | 187/393 |
| 5,992,950 A * | 11/1999 | Kumar et al. | 303/151 |
| 6,041,273 A * | 3/2000 | Burken et al. | 701/3 |
| 6,330,483 B1 * | 12/2001 | Dailey | 700/28 |
| 6,424,873 B1 * | 7/2002 | Przybylski | 700/42 |
| 6,618,631 B1 * | 9/2003 | Johnson et al. | 700/28 |
| 7,131,779 B1 * | 11/2006 | Lin | 400/320 |
| 7,275,518 B1 * | 10/2007 | Gartner et al. | 123/406.23 |
| 7,853,338 B1 * | 12/2010 | Hovakimyan et al. | 700/45 |
| 8,078,292 B2 * | 12/2011 | Fuller | 700/31 |
| 8,082,074 B2 * | 12/2011 | Duggan et al. | 701/24 |
| 8,473,124 B2 * | 6/2013 | Shue et al. | 701/4 |
| 2003/0178958 A1 * | 9/2003 | Akiyama | 318/280 |
| 2004/0174770 A1 * | 9/2004 | Rees | 367/7 |
| 2005/0004723 A1 * | 1/2005 | Duggan et al. | 701/24 |
| 2005/0269872 A1 * | 12/2005 | Ralea | 303/20 |
| 2006/0027710 A1 * | 2/2006 | Lavretsky et al. | 244/195 |
| 2008/0082242 A1 * | 4/2008 | Dell'Eva et al. | 701/60 |
| 2008/0260540 A1 * | 10/2008 | Koehl | 417/44.2 |
| 2010/0141198 A1 * | 6/2010 | Krah | 318/636 |
| 2010/0233555 A1 | 9/2010 | Zirkel et al. | |
| 2011/0062708 A1 * | 3/2011 | Prochaska et al. | 290/7 |

OTHER PUBLICATIONS

Lavretsky et al., "Robust Adaptive Design for Aerial Vehicles with State-Limiting Constraints", IEEE, 2010, pp. 1743-1752.*

Eric N. Johnson and Anthony J. Calise, Pseudo-Control Hedging: A New Method for Adaptive Control, Nov. 1, 2000, 23 pages, Alabama.

GB Combined Search and Examination Report of Application No. GB1108474.6; Sep. 19, 2011; 6 pages.

* cited by examiner

METHODS AND APPARATUS FOR STATE LIMITING IN A CONTROL SYSTEM

BACKGROUND

The field of the disclosure relates generally to control systems and, more specifically, to methods and apparatus for gradually altering vehicle or process dynamics to prevent exceeding pre-specified limit(s) while maximizing achievable performance.

Known vehicles and controlled processes with control augmentation systems rely on state limiters to prevent the exceeding of predetermined state limits. These limiters typically activate once predefined envelope boundaries are exceeded and introduce sharp changes to control characteristics once active. The resulting nonlinearities make analysis using conventional control system methods difficult or invalid. Moreover, known state limiter methods require extensive design and test iterations specific to each individual application, imposing significant repeated costs. In addition, such state limiter methods often represent ad-hoc engineering solutions and do not provide stability or performance guarantees.

Accordingly, a need exists for an application-independent control system that gradually modifies the expected behavior of system dynamics as specified criteria are approached or exceeded.

BRIEF SUMMARY

In one aspect, a method for operating a controlled device is provided. The method includes receiving a feedback signal from the controlled device, the feedback signal indicating actual system dynamics of the controlled device. A predefined limit is applied to the actual system dynamics to create limited system dynamics. A modulation parameter is calculated by a processor based at least in part on the limited system dynamics and the actual system dynamics. Desired system dynamics for the controlled device are generated by the processor based at least in part on the modulation parameter and an external command.

In another aspect, a control system for a controlled device is provided. The control system includes a state limiter and a state limiting logic component coupled in communication with the state limiter. The state limiter is configured to receive a feedback signal indicating actual system dynamics of the controlled device and to apply a predefined limit to the actual system dynamics to create limited system dynamics. The state limiting logic component is configured to calculate a modulation parameter based at least in part on the limited system dynamics and the feedback signal. The modulation parameter indicates an adjustment to apply to desired system dynamics corresponding to an external command.

In yet another aspect, a control system is provided for a vehicle associated with one or more states. The control system includes a state limiter and a state limiting logic component coupled in communication with the state limiter. The state limiter is configured to receive a feedback signal indicating actual system dynamics corresponding to the one or more states and to apply at least one predefined limit to the actual system dynamics to create limited system dynamics. The state limiting logic component is configured to calculate a modulation parameter based at least in part on the limited system dynamics and the feedback signal. The modulation parameter indicates an adjustment to apply to desired system dynamics corresponding to an external command. The external command and the modulation parameter correspond to at least a first state of the one or more states.

The features, functions, and advantages that have been discussed can be achieved independently in various embodiments of the invention or may be combined in yet other embodiments, further details of which can be seen with reference to the following description and drawings.

DETAILED DESCRIPTION

Figure 1:
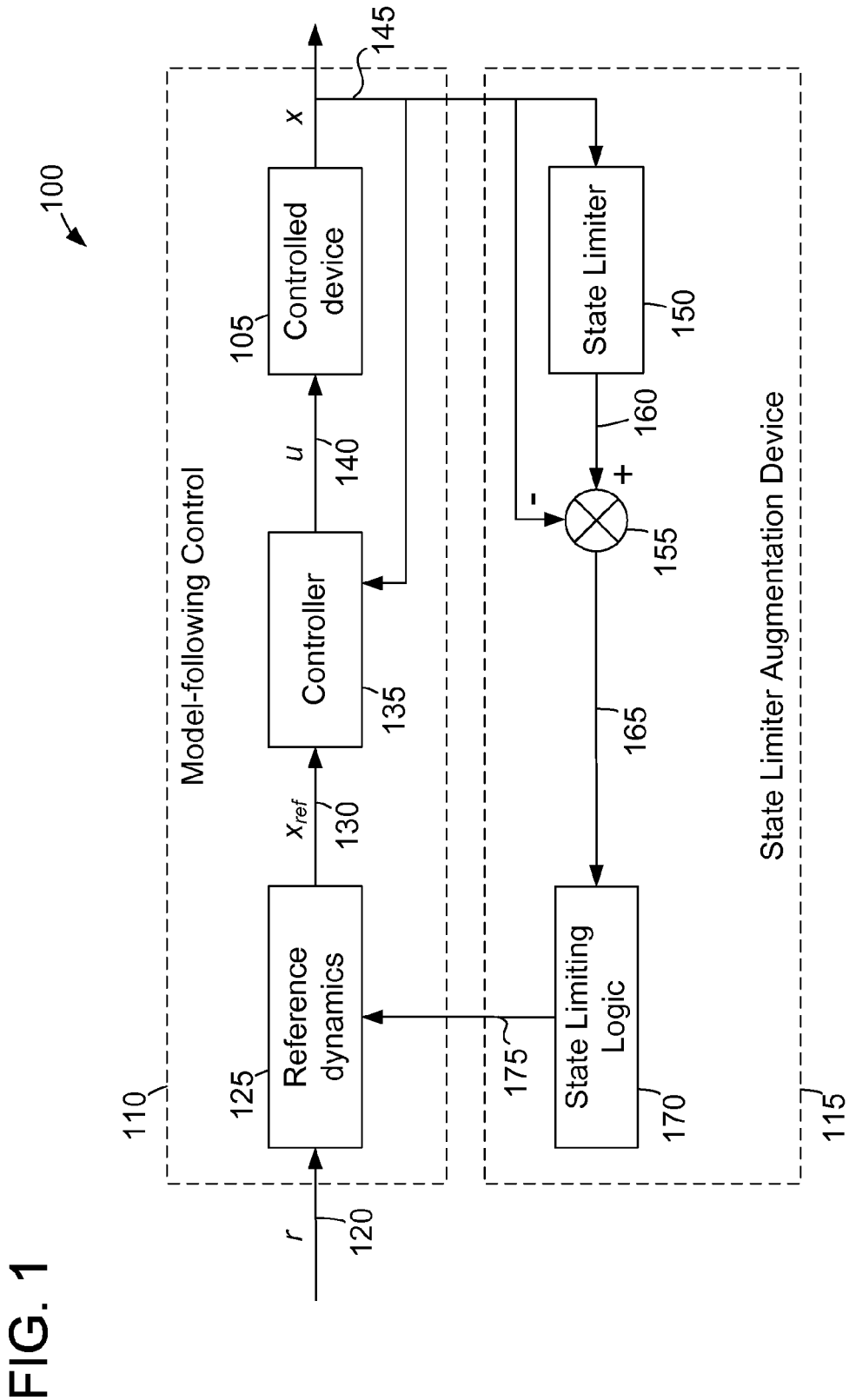
FIG. 1 is a block diagram illustrating one embodiment of a control system.

In various embodiments, an apparatus and method are provided for generating control commands to maximize vehicle or process state-limited performance by gradually or predictably altering vehicle or process dynamics, with guaranteed stability margins and within existing control law architectures. As described herein, a control command includes a signal or other communication instructing a controlled device to perform a desired operation. For example, in the context of aircraft control, a control command may include, without limitation, a signal indicating an adjustment to a flight control surface (e.g., an aileron, an elevator, or a rudder). A controlled device may be associated with one or more degrees of freedom, referred to as states herein.

A control command may be modified or augmented based on a predefined criterion or threshold value. For example, an aircraft control system may have a predefined maximum angle of attack or a predefined never-exceed speed ($v_{NE}$). A modulation function (e.g., a predefined function) may be applied to an input value to provide a gradual progression in output as the input value approaches a predefined threshold.

Embodiments provided herein facilitate maintaining commanded dynamics of control systems within state limit boundaries, smoothly and predictably modulating limiter functionality based on proximity to user-specified limit conditions, and providing direct visibility into traditional linear analysis metrics (e.g. phase and gain margins) at any modulation condition. The methods described may be implemented in an augmentation device that is operable for any feedback control system for a vehicle, controlled process, or both. Moreover, described embodiments facilitate providing a formal, mathematically justified (i.e., non-ad-hoc) gain modulation system compatible with known linear analysis techniques.

Some embodiments are described with reference to figures and mathematical equations. Such figures and equations may include one or more symbols described in Table 1.

TABLE 1

| Symbol | Description |
| --- | --- |
| t | Time |
| r | External command |
| $x_{ref}$ | Reference dynamics (desired system dynamics) |
| U | Control input |
| x, $\bar{x}$ | Actual system dynamics; vector with components representing system degrees of freedom |

TABLE 1-continued

| Symbol | Description |
|---|---|
| $\bar{x}_0$ | Reference point for calculation of normalized state magnitude of $\bar{x}$ |
| $\gamma$ | Modulation parameter |
| $\bar{x}_{lim}$ | Vector with components representing a limit value for each state |
| $\delta$ | Tolerance |
| $\zeta$ | Augmented damping ratio |
| $\omega$ | Augmented frequency |
| $x_{cmd}$ | Time-varying command |
| $\dot{x}$ | State derivative |
| e | Tracking error |

In some embodiments, reference dynamics may be represented mathematically as a system of linear differential equations. As described below, the reference dynamics may be modified to enforce predefined limits by modifying an augmented damping ratio $\zeta$ and a augmented frequency $\omega$.

FIG. 1 is a block diagram illustrating a control system 100 for a controlled device 105, which may also be referred to as a "plant". In some embodiments, control system 100 includes one or more servomechanisms. Controlled device 105 includes one or more devices capable of being controlled, monitored, or both. Such devices include, without limitation, a flight control surface, a throttle, a motor, a valve, an actuator, a switch, an accelerometer, a speedometer, an airspeed sensor, a vertical speed sensor, an altitude sensor, a position sensor (e.g., a global positioning system (GPS) device), or any device that responds to an input signal or produces an output signal indicating a status. Collectively, the output of such devices may be referred to as actual or indicated system dynamics. In some embodiments, controlled device 105 refers to a vehicle (e.g., an aircraft) and all controllable devices therein.

Controlled device 105 may include a plurality of component devices and may be capable of movement in a plurality of directions or orientations. Accordingly, system dynamics representing a desired ($x_{ref}$) or actual (x) state of controlled device 105 may be expressed as a vector that includes components representing degrees of freedom corresponding to controlled device 105.

Control system 100 includes a model-following control subsystem 110 and a state limiter augmentation device 115. Model-following control subsystem 110 is configured to receive an external input or command (r) 120. For example, command 120 may be received from an operator input device or an automated input device, as described with regard to FIG. 4.

External command 120 is applied to a designer-specified reference dynamics component 125. Reference dynamics component 125 represents desired behavior of system 100 and generates a desired system trajectory or desired system dynamics ($x_{ref}$) signal 130 based on the external command 120. Desired system dynamics may also be referred to as "reference dynamics".

A controller 135 generates a command signal (u) 140 and transmits command signal 140 to controlled device 105 Command signal 140 is based on external input 120, desired system dynamics 130, and a feedback signal 145 output by controlled device 105. Feedback signal 145 indicates an actual state of controlled device 105. For example, in normal operation, feedback signal 145 may reflect a progression of system dynamics x toward desired or reference dynamics $x_{ref}$ over time.

Controller 135 is designed to cause the system dynamics x to match the reference dynamics $x_{ref}$ even in the presence of plant modeling uncertainty and external disturbances. In existing systems, reference dynamics are often explicitly taken into account in the design of the controller. For example, in existing aircraft model-following control systems, a pilot or guidance system generates external command 120, which is used to generate reference dynamics signal 130. Reference dynamics signal 130 in this case indicates the desired response of the aircraft, perhaps dependent on flight condition. Based on reference dynamics signal 130, controller 135 generates command signal 140, which may include, for example, surface deflections, throttle adjustments, etc. that are designed to force the true aircraft response to match reference dynamics 130. The resulting aircraft response is captured in the plant output signal 145.

At least some existing vehicles and controlled processes with control augmentation systems rely on state limiters to prevent the exceeding of predetermined state limits. These limiters typically activate when predefined envelope boundaries are exceeded by actual system dynamics and provide a signal to reference dynamics component 125 or controller 135, inducing sharp or abrupt changes to control characteristics. For example, a state limiter may intervene to suddenly cease increasing throttle input when a desired velocity is attained. The resulting nonlinearities make analysis using conventional control system methods difficult or invalid.

In an exemplary embodiment, state limiter augmentation device 115 is configured to gradually modify the expected behavior of the system dynamics when user-specified criteria are approached or exceeded. Such criteria may be defined, for example, to define the bounds of a performance capability or an operating envelope (e.g., a maximum velocity or a maximum acceleration). The modification of the expected behavior of the system dynamics is facilitated by gradually and predictably altering the reference dynamics of the system in regions proximate to the defined state limits.

Figure 2:
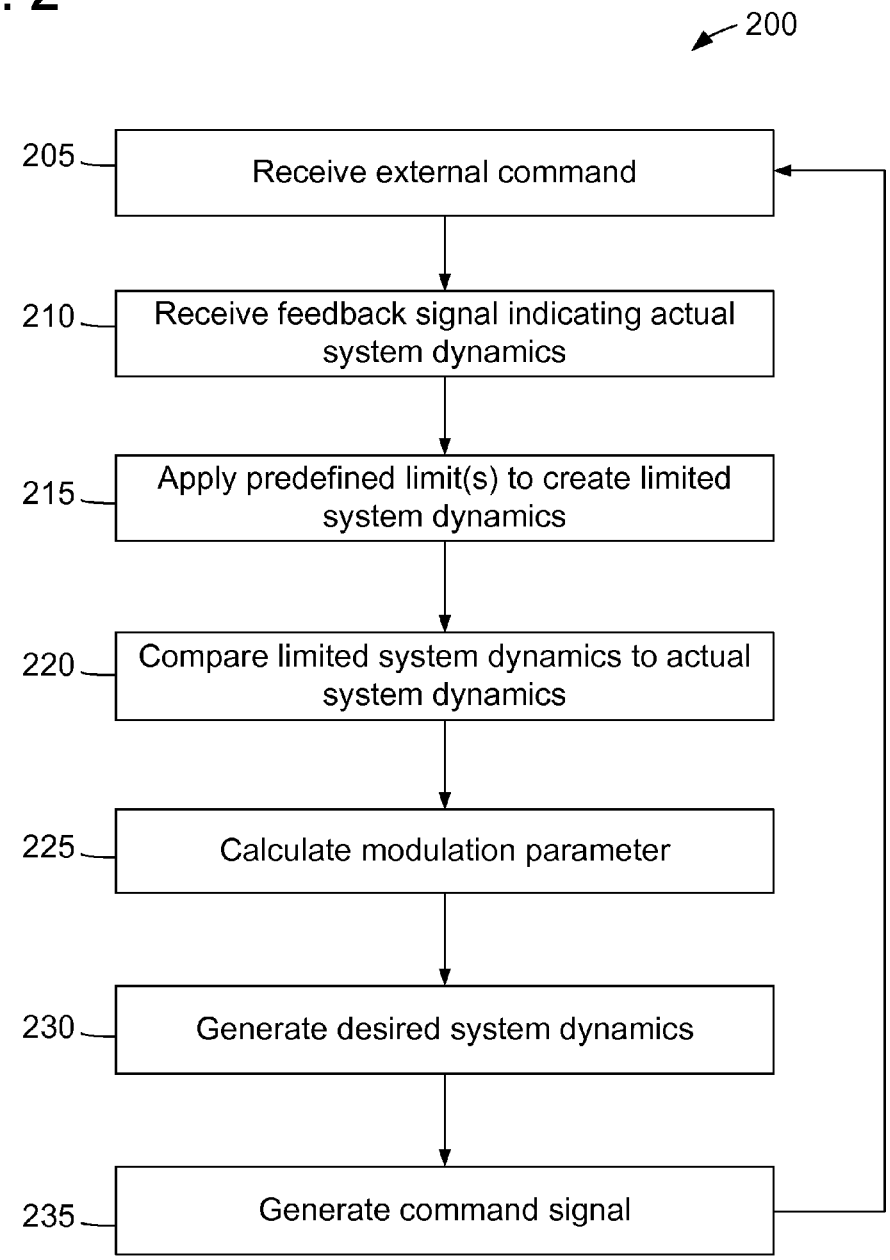
FIG. 2 is a flowchart illustrating an exemplary method for operating a controlled device.

FIG. 2 is a flowchart illustrating an exemplary method 200 for operating a controlled device. Method 200 is described with reference to system 100 including state limiter augmentation device 115 but may be implemented with any control system operable to perform to steps described.

Method 200 includes receiving 205 an external command 120 by reference dynamics component 125. For example, external command 120 may include an instruction to achieve a velocity of 100 feet per second (ft/s). State limiter augmentation device 115 receives 210 feedback signal 145, which indicates actual system dynamics (e.g., including a current indicated velocity of 120 ft/s) of controlled device 105.

State limiter augmentation device 115 includes a state limiter 150 and a summation component 155. Feedback signal 145 is transmitted to both state limiter 150 and summation component 155. State limiter 150 applies 215 at least one predefined limit to the actual system dynamics indicated by feedback signal 145 to create limited system dynamics. For example, given a current velocity of 120 ft/s and a limit of 100 ft/s (e.g., based on external command 120), state limiter 150 may output limited system dynamics indicating a velocity of 100 ft/s. The limited system dynamics are communicated to summation component 155 by a limited system dynamics signal 160.

Summation component 155 compares 220 the actual system dynamics x, as indicated by feedback signal 145, against the limited system dynamics, as indicated by limited system dynamics signal 160. In an exemplary embodiment, summation component 155 subtracts the actual system dynamics from the limited system dynamics and transmits a difference signal 165 indicating proximity of actual system dynamics x to the predefined limits of operation. Continuing the example above, summation component 155 may subtract the actual system dynamics (indicating a velocity of 120 ft/s) from the limited system dynamics (indicating a velocity of 100 ft/s), resulting in a difference of −20 ft/s.

Based at least in part on difference signal 165, a state limiting logic component 170 calculates 225 a modulation parameter operable to alter the reference dynamics. In an exemplary embodiment, state limiting logic component 170 transmits a state limiting signal 175, which may indicate, for example, the modulation parameter, to reference dynamics component 125, which generates 230 desired system dynamics (i.e., reference dynamics) based at least in part on external command 120 and the state limiting signal. Controller 135 generates 235 command signal 140 for controlled device 105 based at least in part on desired system dynamics signal 130. Thus, command signal 140 is adjusted as actual system dynamics approach predefined limits. Controller 135 may generate 235 command input based further on feedback signal 145.

Method 200 may be performed repeatedly (e.g., periodically, continuously, or upon receiving an external command). In an exemplary embodiment, method 200 is performed continuously in real time.

Method 200 facilitates continually updating a control goal, as represented by reference dynamics, such that the system output (i.e., actual system dynamics) tracks the control goal while staying within predefined control limits. For example, the reference dynamics may be represented mathematically as a system of linear differential equations. Some embodiments limit the reference dynamics by modifying the desired augmented damping ratio and augmented frequency, ζ and ω respectively, of the differential equations to enforce reference dynamics that do not exceed the predefined limits. Resulting control commands maximize vehicle or process state-limited performance, with guaranteed stability margins and within existing control law architectures. The region defined as sufficiently close to state limits for the proposed modification to become active is defined by the designer, so that in all nominal system conditions (away from state limits), the desired baseline control system behavior and system dynamics (i.e., without state limiting) are achieved.

In some embodiments, state limiting is accomplished via a modulation function, which may be a linear or nonlinear function. In an exemplary embodiment, the modulation function ensures that the limiter is inactive in nominal conditions until system state (i.e., the actual system dynamics) approaches defined limits within a user-defined tolerance δ. The limiter is then gradually applied as the system state approaches the state limits, avoiding undesirable behavior.

Figure 3:
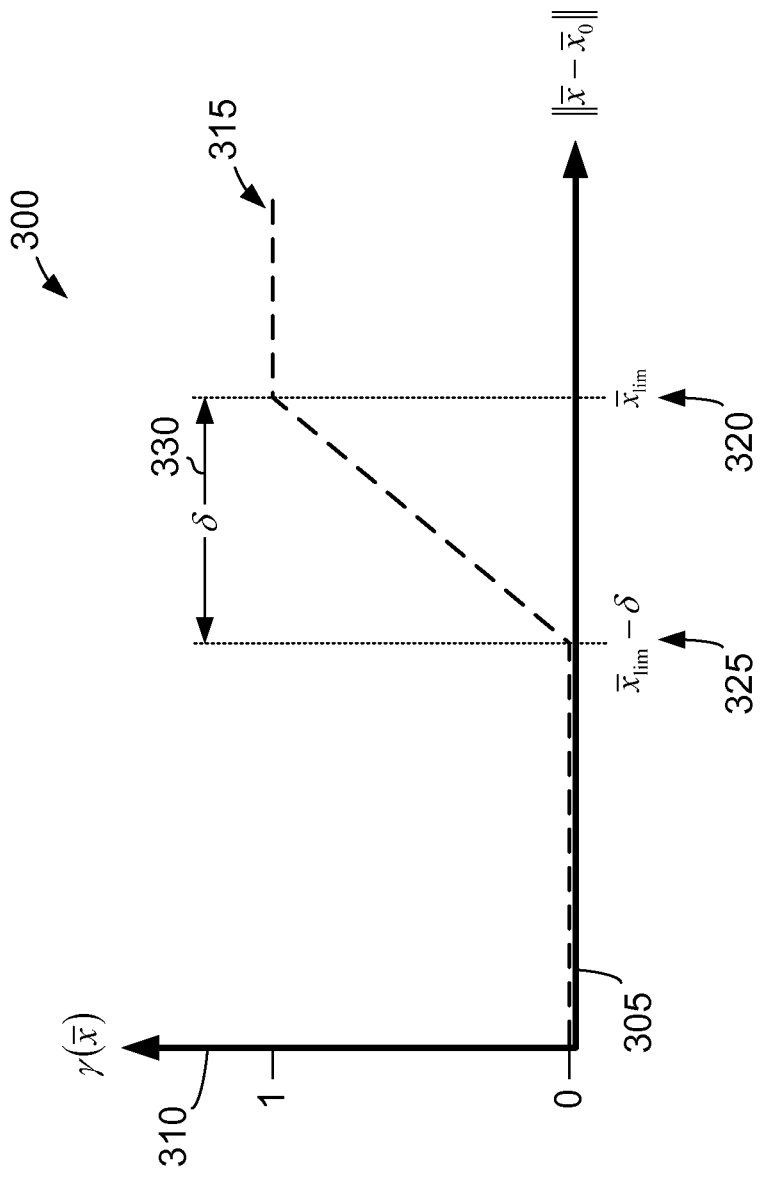
FIG. 3 is a graph of a modulation parameter calculated using a predefined function.

FIG. 3 is a graph 300 of a modulation parameter calculated using an exemplary continuous piecewise linear function, as shown in Equation 1.

$$\gamma(\bar{x}) = \max\left[0, \min\left[1, 1 + \frac{\|\bar{x} - \bar{x}_0\| - \bar{x}_{lim}}{\delta}\right]\right] \quad \text{(Eq. 1)}$$

Graph 300 includes an x-axis 305 corresponding to the normalized state magnitude. A y-axis 310 corresponds to the output modulation parameter γ. A line 315 plots the modulation parameter with respect to the normalized state magnitude. While graph 300 may be understood in the context of a single or scalar value (e.g., a linear velocity), a modulation function such as Equation 1 may be applied to multi-dimensional or vector quantities. Accordingly, $\bar{x}$ is defined as a vector including components that represent the system states, while $\bar{x}_{lim}$ is a vector with components representing the limit value for each system state. Equation 1 may be generalized to account for asymmetric (around zero) state limits.

As shown in FIG. 3, line 315 represents a modulation parameter having a range of possible values between zero and one. This range corresponds to the nested minimum and maximum functions within Equation 1. Graph 300 depicts a predefined limit 320 for one or more degrees of freedom. Above predefined limit 320, line 315 represents a modulation parameter of 1.

In at least some existing systems, the modulation parameter would be equal to zero below predefined limit 320 and abruptly change to one at predefined limit 320 (e.g., according to a stepwise function). Equation 1, in contrast, facilitates a gradual increase in the modulation parameter beginning at a limiter onset point 325. In an exemplary embodiment, limiter onset point 325 is defined as predefined limit 320 minus a predefined tolerance (δ) 330. As illustrated by line 315, Equation 1 defines a relationship between the normalized state magnitude and the modulation parameter between limiter onset point 325 and predefined limit 320. Given a fixed range of values for the modulation parameter (i.e., between zero and one), the slope of line 315 between limiter onset point 325 and predefined limit 320 is determined at least in part by the magnitude of tolerance 330. Embodiments employing a function such as shown in Equation 1 and FIG. 3 to determine a modulation parameter facilitate gradually applying state limits to achieve stable, model-based operation of a controlled device while ensuring predefined limits are not exceeded.

Operation of some embodiments may be understood with reference to the double-integrator dynamics $\ddot{x}=u$, where x is the system state and u is the control input. In an exemplary model-following control system, the control goal is to choose u such that x tracks or "follows" the state of the reference model $x_{ref}$, the dynamics of which are expressed by Equation 2.

$$\ddot{x}_{ref} = -2\zeta\omega\dot{x}_{ref} + \omega^2(x_{cmd} - x_{ref}) \quad \text{(Eq. 2)}$$

In Equation 2, ζ and ω represent the desired augmented damping ratio and augmented frequency, respectively. Note that the reference dynamics are driven by a bounded and possibly time-varying command $x_{cmd}$. Furthermore, it may be required that the system state x does not exceed its pre-specified limits. Such a requirement may be expressed as Equation 3.

$$-x_{lim} \leq x(t) \leq x_{lim} \quad \text{(Eq. 3)}$$

In order to ensure feasibility of a control solution, it may be assumed that the commanded signal $x_{cmd}$ satisfies the same limits. For clarity, it may also be assumed that the state derivative $\dot{x}$ is available on line. A control solution may be chosen as shown in Equation 4.

$$u = -2\zeta\omega\dot{x} + \omega^2(x_{cmd} - x) \quad \text{(Eq. 4)}$$

Applying Equation 4 yields a closed-loop system described by Equation 5.

$$\ddot{x} = -2\zeta\omega\dot{x} + \omega^2(x_{cmd} - x_{ref}) \quad \text{(Eq. 5)}$$

Tracking error may be calculated using Equation 6.

$$e = x - x_{ref} \quad \text{(Eq. 6)}$$

The reference dynamics may be subtracted from the system dynamics, as shown in Equation 7.

$$\ddot{e} = -2\zeta\omega\dot{e} - \omega^2 e \quad \text{(Eq. 7)}$$

The relation expressed by Equation 7 implies global exponential stability of the origin. Consequently, in existing model-following control systems, the system state x(t) tracks the state of the reference model $x_{ref}(t)$ exponentially quickly, starting from any initial conditions. However, in existing model-following control systems, the desired state limits $x_{min}$ and $x_{max}$ are not guaranteed.

Embodiments provided herein apply a formal design modification to enforce these state limits. For example, the desired augmented damping ratio and augmented frequency may be gradually changed if or as the system state approaches any of its limits. In an exemplary embodiment, the state limiter logic introduces a state-dependent augmented damping ratio and augmented frequency. In this example, the system degrees of freedom are x and X, so the quantity $\bar{x}$ can be represented as $(x,\dot{x})$. Accordingly, the augmented damping ratio $\zeta$ and the augmented frequency $\omega$ may be calculated as shown in Equations 8 and 9, respectively.

$$\zeta_x = \zeta + \gamma(x,\dot{x})\Delta\zeta(x,\dot{x}) \quad \text{(Eq. 8)}$$

$$\omega_x = \omega + \gamma(x,\dot{x})\Delta\omega(x,\dot{x}) \quad \text{(Eq. 9)}$$

In some embodiments, the reference dynamics $x_{ref}$ and the control input u may be calculated as shown in Equations 10 and 11, respectively.

$$\ddot{x}_{ref} = -2\zeta_x\omega_x\dot{x}_{ref} + \omega_x^2(x_{cmd} - x_{ref}) \quad \text{(Eq. 10)}$$

$$u = -2\zeta_x\omega_x\dot{x}_{ref} + \omega_x^2(x_{cmd} - x) \quad \text{(Eq. 11)}$$

In such an embodiment, $0 \leq \gamma(x,\dot{x}) \leq 1$ is the modulation parameter, while $\Delta\zeta(x,\dot{x})$ and $\Delta\omega(x,\dot{x})$ represent a user-defined incremental augmented damping ratio table and a user-defined augmented frequency table, respectively. Values within these tables may be predefined by a user to meet the desired tracking performance and the system robustness requirements. For example, the reference model can be modified such that its state has no overshoot while tracking a step-input command. Hence, if the step-input command is within the limits, then the system state and the reference model state will remain within the desired limits, as well.

By calculating the modulation parameter based on the augmented damping ratio table and the augmented frequency table, embodiments provided herein facilitate creating a control system operable to control a plurality of vehicles or processes by gradually altering system dynamics with guaranteed stability margins and within existing control law architectures. The viability of the control system for a particular application may be established by mathematical justification. Accordingly, the need for design and test iterations specific to each individual application may be reduced.

Figure 4:
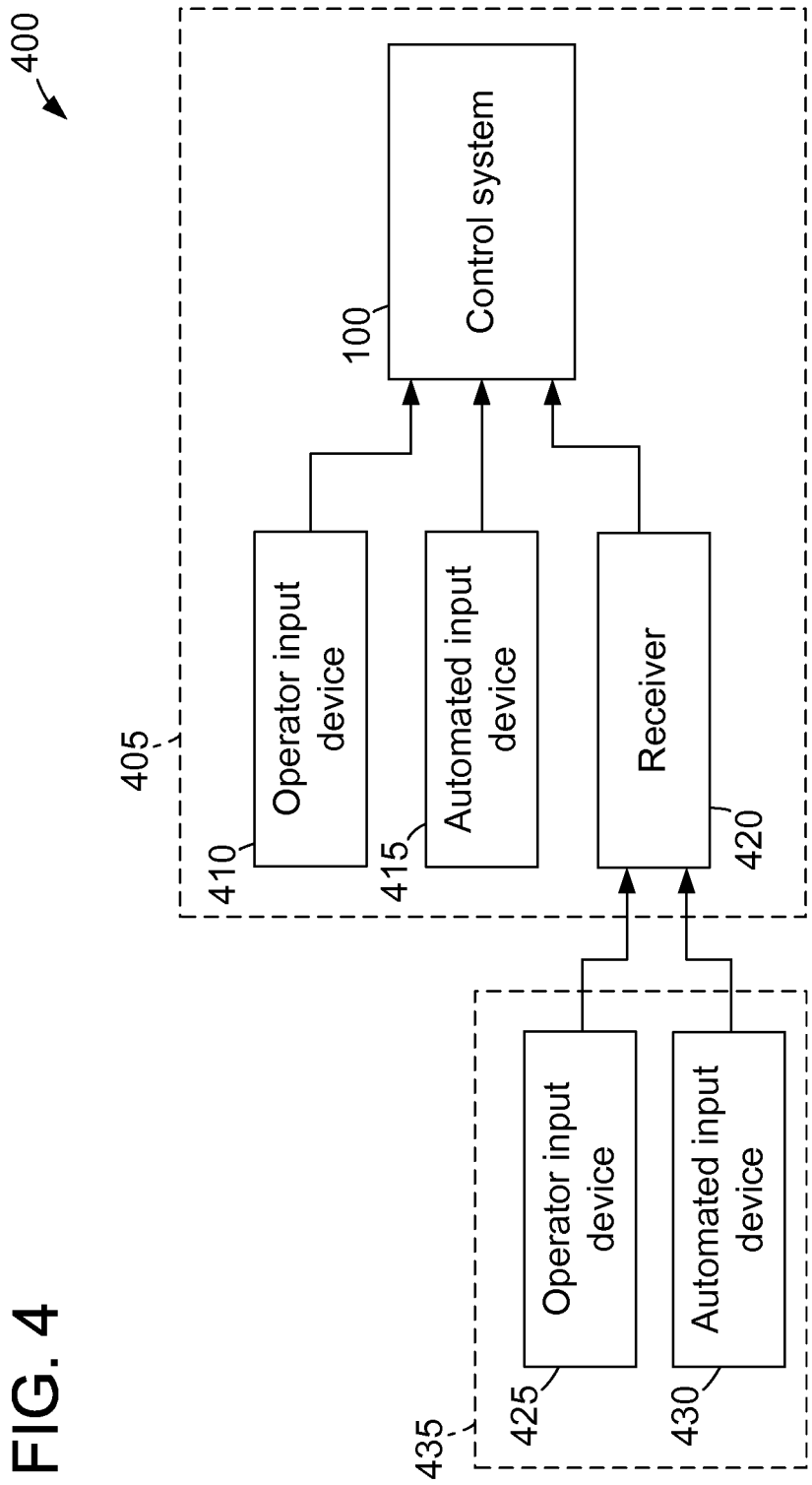
FIG. 4 is a block diagram illustrating one embodiment of a vehicle control system.

FIG. 4 is a block diagram illustrating one embodiment of a vehicle control system 400. System 400 includes a vehicle 405 with a control system 100 (shown in FIG. 1). System 100 is configured to receive one or more external commands from a local operator input device 410, a local automated input device 415, a receiver 420, or any combination thereof. Receiver 420, in turn, is configured to receive external commands from a remote operator input device 425, a remote automated input device 430, or a combination thereof, which may be located at one or more remote control facilities 435.

Operator input devices 410, 425 are configured to receive control input from a human operator. For example, a human operator may pilot vehicle 405 either locally (e.g., onboard vehicle 405) or remotely (e.g., at remote control facility 435). Automated input devices 415, 430 are configured to generate control input according to a predefined algorithm. In some embodiments, automated input devices 415, 430 include an autopilot system operable to pilot vehicle 405 without human intervention. Moreover, an automated input device may be programmed by a human operator to perform a sequence of operations (e.g., navigating vehicle 405 to a specific location).

In one embodiment, vehicle 405 includes an unmanned or unpiloted aerial vehicle (UAV), and remote control facility 435 includes a UAV control station. However, embodiments provided herein are operable with any locally or remotely controlled vehicle or mechanical process.

The subject matter of the present disclosure is described with specificity herein to meet predefined design requirements. However, the description itself is not intended to limit the scope of this patent. Rather, it has been contemplated that the claimed subject matter might also be embodied in other ways, to include different steps or combinations of steps similar to the ones described in this document, in conjunction with other present or future technologies. Moreover, although the terms "step," "block," or "operation" may be used herein to connote different elements of methods employed, the terms should not be interpreted as implying any particular order among or between various steps herein disclosed unless and except when the order of individual steps is explicitly described.

Methods and components described herein may be encoded as executable instructions embodied in a computer readable medium, including, without limitation, a storage device or a memory area of a computing device. Such instructions, when executed by a processor, cause the processor to perform at least a portion of the methods described herein. Moreover, such method and components may be implemented as hardware devices, such as analog or digital circuits, including, without limitation, an application specific integrated circuit (ASIC) or a field programmable gate array (FPGA).

This written description uses examples to disclose the described embodiments, including the best mode, and also to enable any person skilled in the art to practice the described embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for operating a controlled device, the method comprising:

receiving an external command that represents a desired system dynamics for the controlled device;

receiving a feedback signal from the controlled device, the feedback signal indicating actual system dynamics of the controlled device;

applying a predefined limit to the actual system dynamics to create limited system dynamics;

calculating, by a processor, a modulation parameter based at least in part on a predefined tolerance and a difference between the limited system dynamics and the actual system dynamics; and generating, by the processor, the desired system dynamics for the controlled device based at least in part on the modulation parameter, wherein the modulation parameter enables a value of the external command to be approached gradually without exceeding the predefined limit at a particular rate, and wherein the particular rate is calculated based on the difference between the limited system dynamics and the actual system dynamics and a length of time corresponding to a magnitude of the predefined tolerance.

2. The method of claim 1, wherein the modulation parameter is calculated by applying a predefined function to the limited system dynamics, the actual system dynamics, the predefined limit, and a predefined tolerance.

3. The method of claim 1, wherein the controlled device is a vehicle associated with a plurality of states, the method further comprising generating desired system dynamics for each state of the plurality of states.

4. The method of claim 1, wherein generating the desired system dynamics comprises generating the desired system dynamics in real time.

5. The method of claim 1, further comprising generating a command signal for the controlled device based at least in part on the desired system dynamics.

6. The method of claim 1, wherein applying a predefined limit to the actual system dynamics comprises applying at least one predefined limit corresponding to an operating envelope of the controlled device.

7. The method of claim 6, wherein generating desired system dynamics for the controlled device comprises generating desired system dynamics within the at least one predefined limit.

8. The method of claim 6, further comprising generating a command signal for the controlled device based on the desired system dynamics, wherein the command signal enforces the at least one predefined limit.

9. A control system for a controlled device, the control system comprising:
a state limiter configured to:
receive a feedback signal indicating actual system dynamics of the controlled device; and
apply a predefined limit to the actual system dynamics to create limited system dynamics; and
a state limiting logic component coupled in communication with the state limiter and configured to:
calculate a modulation parameter based at least in part on a predefined tolerance and a difference between the limited system dynamics and the feedback signal, the modulation parameter indicating an adjustment to apply to desired system dynamics corresponding to an external command, wherein the adjustment enables a value of the external command to be approached gradually without exceeding the predefined limit at a particular rate, and wherein the particular rate is calculated based on the difference between the limited system dynamics and the actual system dynamics and a length of time corresponding to a magnitude of the predefined tolerance.

10. The control system of claim 9, wherein the state limiter is configured to apply a predefined limit representing a performance capability of the controlled device.

11. The control system of claim 9, further comprising a reference dynamics component coupled in communication with the state limiting logic component and configured to generate desired system dynamics based at least in part on the external command and the modulation parameter.

12. The control system of claim 11, wherein the state limiting logic component is further configured to calculate the modulation parameter such that the desired system dynamics generated by the reference dynamics component enforce the predefined limit.

13. The control system of claim 11, further comprising a controller coupled in communication with the reference dynamics component and configured to generate an input command for the controlled device based at least in part on the desired system dynamics.

14. The control system of claim 13, wherein the controller is configured to generate the input command based further on the feedback signal, wherein the input command is generated in real time.

15. The control system of claim 11, wherein the reference dynamics component is configured to receive the external command from a remote device.

16. The control system of claim 9, wherein the controlled device is associated with one or more states, the predefined limit comprises a plurality of limits corresponding to each state of the one or more states, and calculating a modulation parameter comprises calculating a modulation parameter corresponding to each state of the one or more states.

17. A control system for a vehicle associated with one or more states, the control system comprising:
a state limiter configured to:
receive a feedback signal indicating actual system dynamics corresponding to the one or more states; and
apply at least one predefined limit to the actual system dynamics to create limited system dynamics; and
a state limiting logic component coupled in communication with the state limiter and configured to:
calculate a modulation parameter based at least in part on a predefined tolerance and a difference between the limited system dynamics and the feedback signal, the modulation parameter indicating an adjustment to apply to desired system dynamics corresponding to an external command, wherein the modulation parameter enables a value of the external command to be approached gradually without exceeding the predefined limit at a particular rate, and wherein the particular rate is calculated based on the difference between the limited system dynamics and the actual system dynamics and a length of time corresponding to a magnitude of the predefined tolerance.

* * * * *